May 12, 1964 A. COTSWORTH III 3,133,269

REMOTE CONTROL SYSTEM

Filed April 20, 1959 2 Sheets-Sheet 1

INVENTOR
Albert Cotsworth III
BY James F. Jennings, Jr.
ATTORNEY

REMOTE CONTROL SYSTEM

Filed April 20, 1959 2 Sheets-Sheet 2

INVENTOR
Albert Cotsworth III
BY James J. Jennings, Jr.
ATTORNEY

United States Patent Office 3,133,269
Patented May 12, 1964

3,133,269

REMOTE CONTROL SYSTEM

Albert Cotsworth III, Oak Park, Ill., assignor to Zenith Radio Corporation, a corporation of Delaware Filed Apr. 20, 1959, Ser. No. 807,502
4 Claims. (Cl. 340—171)

Figure 1:
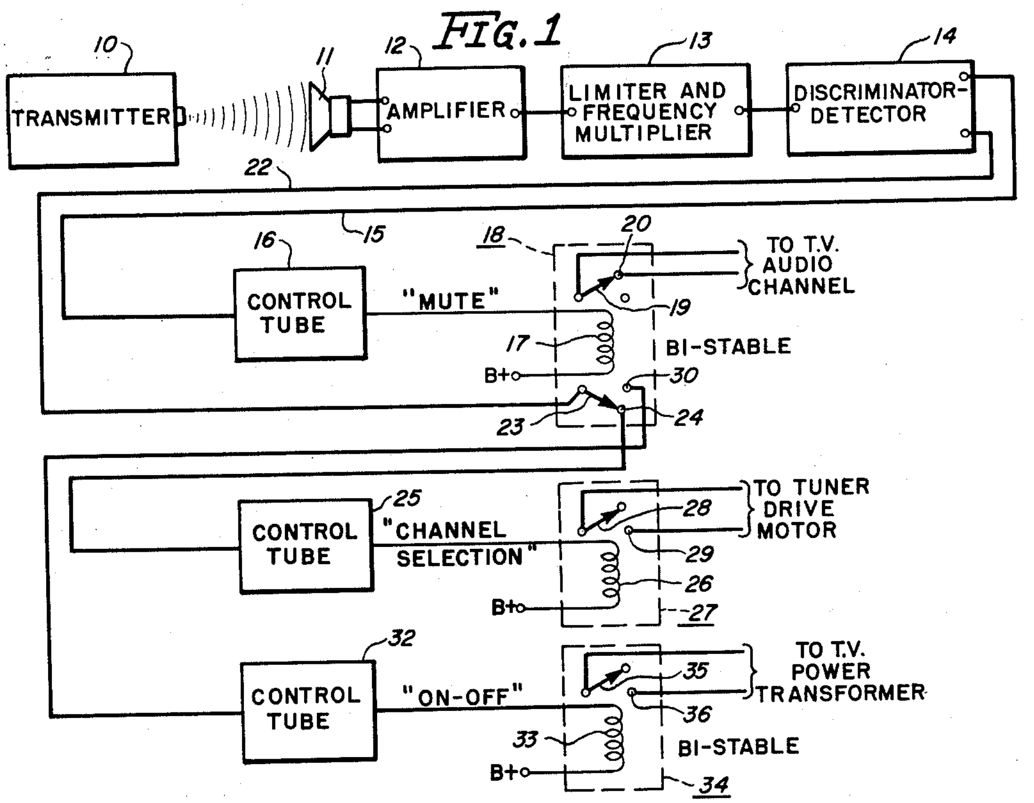

This invention relates to remote control systems for selectively accomplishing any of a plurality of functions at a controlled or satellite station in response to command signals originated at a remotely located controlling station. More particularly, the invention is directed to enhancing the versatility and capabilities of such a system by providing a number of controlled functions exceeding the number of individual signal frequencies generated at the remote transmitter.

Remote control systems of the type under consideration are useful in a variety of installations both in the home and in industry. Familiar examples of domestic installations are the control of radio and television receivers, garage doors, slide projectors, etc. Industrial uses are numerous, including the control of work-handling devices in general, furnaces, metal-working apparatus and the like. For the purpose of providing a specific disclosure of the invention, it is convenient to consider its application to a television receiver for use in the home.

A remote control system for radiating a particular command signal and adjusting one of several operating characteristics of a television receiver installed in the home in accordance with the particular signal received is the subject of United States Letters Patent 2,817,025, issued December 17, 1957, to Robert Adler and assigned to the assignee of the present invention. As there described, four different command signals are generated at the transmitter and propagated to the receiver. Each signal is of a different frequency; the four signal frequencies are grouped within a narrow portion of the frequency spectrum. The control chassis has a correspondingly narrow acceptance bandwidth and therefore is relatively free from the influence of interfering signals of other frequencies which may be present at the receiver location. By assigning a different frequency to each of the command signals and by employing frequency-selective channels in the receiver, it is possible to determine at the receiver location exactly which of the several functions is to be controlled. In the Adler patent, four different command signals may be selectively transmitted and in turn four different functions are controlled at the television receiver.

The controlled functions may be, for example, regulation of an on-off switch in the television receiver, the rotation of the channel selector in either direction (rotation in two directions is two separate functions), and regulation of the volume level or a muting control. Rapid and widespread commercial acceptance greeted the introduction of such a system to the public. However, a reduction in cost and complexity of the remote control receiver circuitry can be effected by providing only two controlled functions. Accordingly, a ready market has also been found for a two-button or two-signal control system regulating channel selection by unidirectional rotation of the tuner elements and also providing adjustment of the receiver volume level. Of course, it would be desirable to add one or more additional controlled functions to the receiver used in two-channel operation by incorporating only minor circuit changes in the control chassis.

It is therefore a principal object of the invention to provide a remote control system of increased versatility and capacity for effecting controlled functions.

It is a more specific object of the invention to provide a new and improved remote control system in which the number of controlled functions which may be accomplished exceeds the number of control signal frequencies generated at the command transmitting device.

A remote control system constructed in accordance with the inventive teaching selectively accomplishes a number of receiver control functions in response to the receipt of a lesser number of remotely transmitted time-spaced control signals. Such a system includes a receiver for the control signals having a pair of output channels. A first control device is coupled to one of the output channels and operates in response to the receipt of a first control signal. The device includes a control means and first and second switch means concurrently operated by the control means. The first switch means effects a first control function. Additional control devices are provided for effecting additional control functions, respectively, in response to receipt of at least one additional control signal. The second switch means is multi-stable and switches the other of the output channels sequentially from coupling with one to coupling with another of the additional control devices to condition successively different ones of the additional control devices to respond to an additional control signal upon repeated occurrences of the first control signal.

Figure 2:
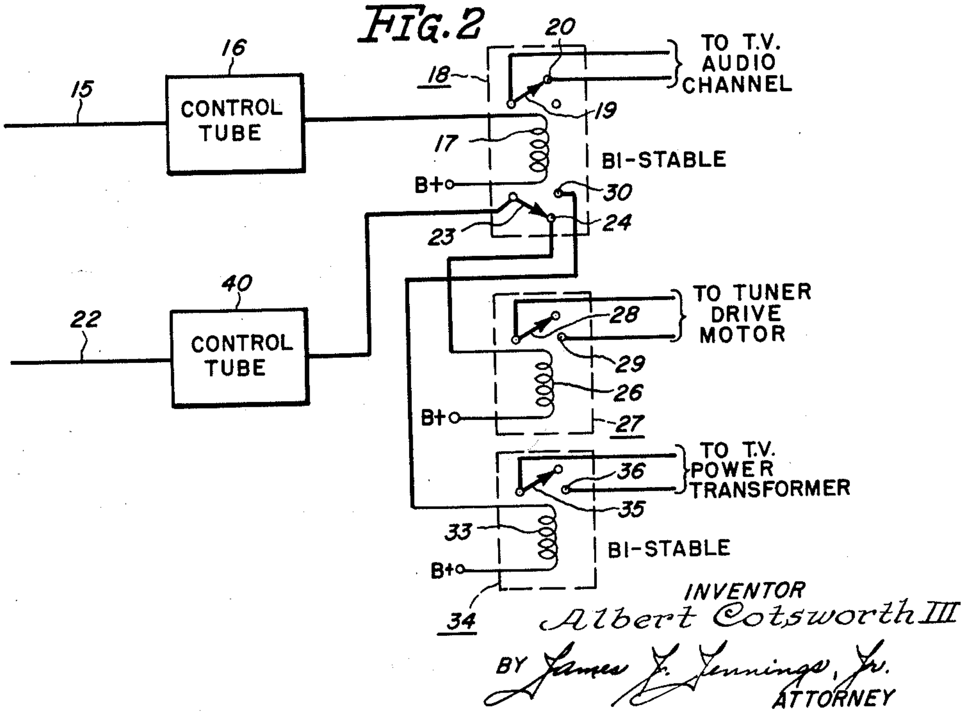
Figure 3:
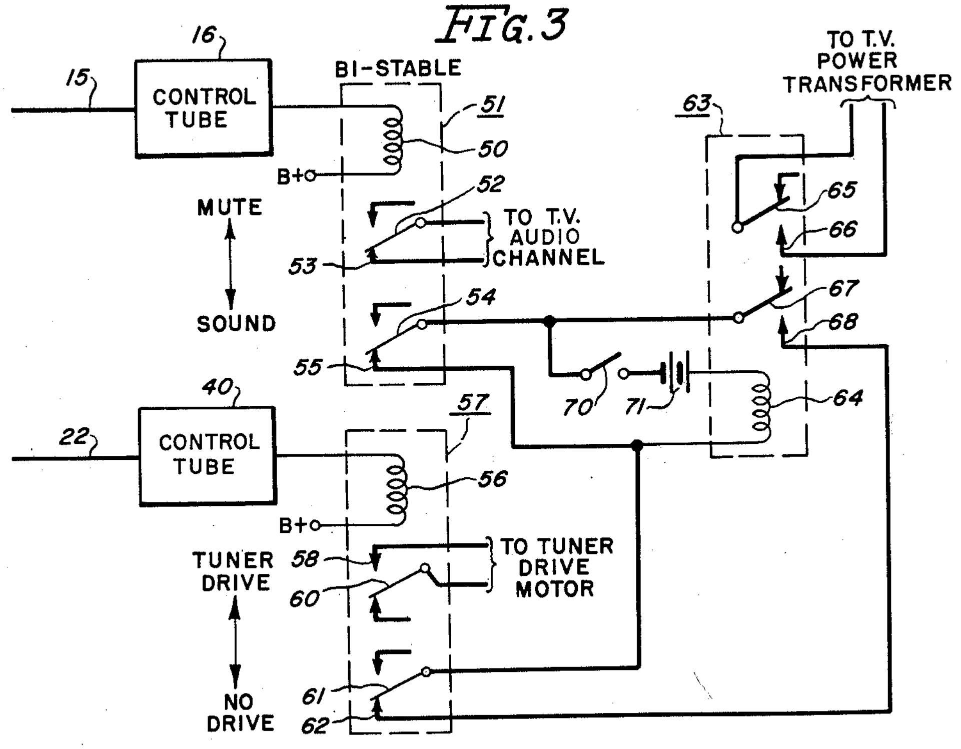
Figure 4:
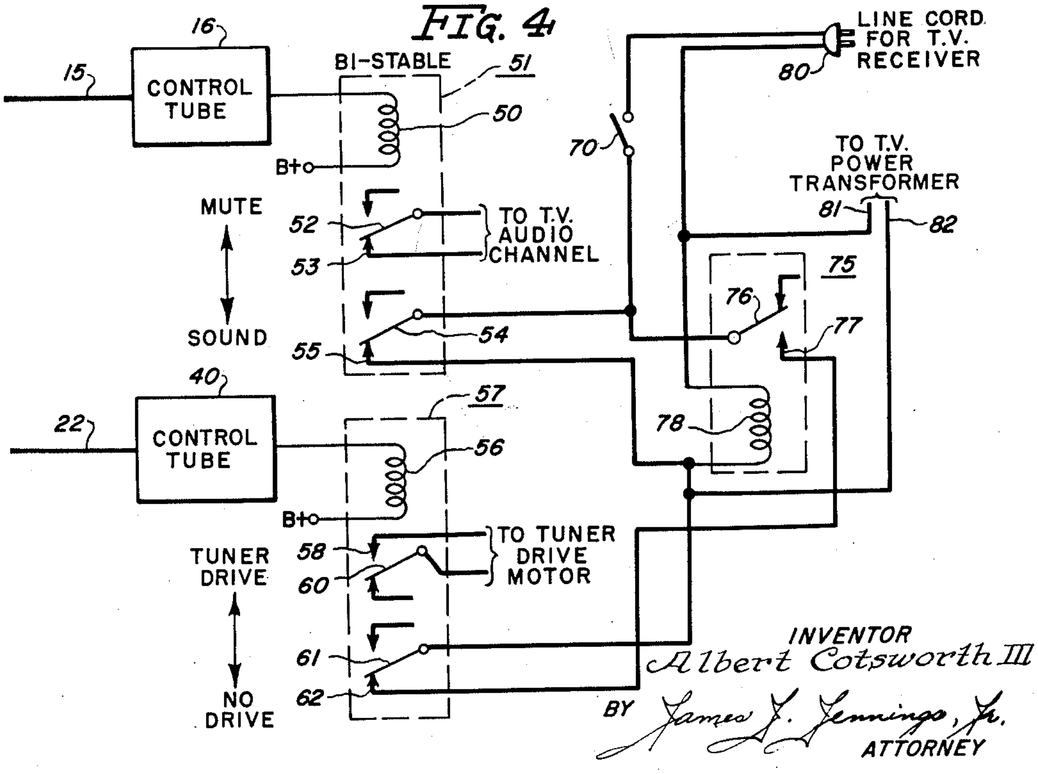

The features of this invention which are believed to be novel are set forth with particularity in the appended claims. The invention, together with further objects and advantages thereof, may best be understood, however, by reference to the following description taken in conjunction with the accompanying drawings, in the several figures of which like reference numerals identify like elements, and in which:

FIGURE 1 is a block diagram of a remote control system constructed in accordance with the invention; and FIGURES 2–4 are partial block diagrams illustrating other embodiments of the invention.

The remote control system of FIGURE 1, except for certain portions described specifically hereinafter, is essentially the same as that of the Adler patent to which reference may be had for structural details of the remote control transmitter, control chassis and the connections extending from the control chassis to the controlled television receiver. Because no novelty is here predicated on those components, they have not been shown in detail and are incorporated herein by reference to the Adler patent. Although the use of four channels and four controlled functions is taught by Adler, it is apparent that by eliminating one of the balanced detectors and its appended circuitry, the remaining circuitry including a single balanced detector and two signal channels is sufficient to regulate two controlled functions.

The embodiment of the present invention illustrated generally in FIGURE 1 includes a transmitter 10 for developing two ultrasonic command signals differing in frequency. Transmitter 10 may comprise a pair of passive longitudinal-mode mechanical vibrators in the form of a rod of aluminum or other material. A mechanical striker is associated with a free end of each rod and is actuated by a push button or similar mechanism to strike the rod and establish it in longitudinal mechanical vibration, thus propagating the desired control signal. The two buttons are hereinafter referred to as the mute control and the channel selector. As mentioned, structural details of such a generator, particularizing as to the longitudinal mode vibrator and its actuating mechanism, are disclosed in the Adler patent. Other portions or aspects of the same transmitter are disclosed and claimed in Patent Nos. 2,821,954; 2,821,955; and 2,821,956, all of which issued on February 4, 1958, and are assigned to the assignee of this invention.

The remote control chassis associated with the controlled television receiver includes a device such as an electrostatic microphone, designated by numeral 11 in the drawing, for accepting commands emanating from transmitter 10. An amplifier 12 is coupled to microphone 11 and it preferably has a narrow frequency acceptance band, restricted to embrace substantially only the frequencies radiated by transmitter 10. This selectivity enables the control chassis to reject signals other than those appearing within the narrow portion of the frequency spectrum in which the commands are transmitted and endows the system with considerable freedom from spurious actuation. Coupled to amplifier 12 is a limiter and multiplier stage 13.

Because of the relatively small frequency separation of the command signals, it is desirable to multiply the frequencies received in microphone 11 so that their absolute frequency separation is greater than that of the radiated command signals. This facilitates their selection and separation in a frequency discriminator-detector 14, coupled to limiter-multiplier 13.

As explained in the Adler patent, the discriminator-detector circuit has a response characteristic which is peaked at two separated frequencies corresponding to the frequencies of the signals sent out by transmitter 10. The peaks are equally spaced on opposite sides of a center frequency, one peak occurring at the frequency of the mute command signal and the other peak occurring at the frequency of the channel selection command signal. An actuating or command signal appears in one output channel (shown schematically as one output terminal of discriminator-detector 14) in response to a command signal of one frequency (mute), and a similar command signal is developed in the other output channel in response to the command signal of different frequency (channel selection).

Operation of either button actuator on transmitter 10 results in the generation and radiation of an ultrasonic signal of a preassigned and closely controlled frequency. Energy at that frequency impinges upon microphone 11, is amplified in amplifier 12 and limited in amplitude and multiplied in frequency in stage 13. The frequency-multiplied signal corresponds to one of the peaked response frequencies of discriminator-detector 14. Specifically, if the received command signal is of one frequency, a command signal appears in one output channel of detector 14. If the received signal is of the other frequency, a command signal is developed in the other output channel of detector 14.

As to the structural details of the remainder of the inventive circuit as depicted in FIGURE 1, the first output channel of balanced detector 14 is coupled over a conductor 15 to the input circuit of a control tube 16. The output circuit of control tube 16 is coupled through winding 17 of a control device or relay 18 to a source of unidirectional positive operation potential, conventionally designated B+. Relay 18 is bistable. That is, it has two "at rest" positions, and each control or actuating signal applied to winding 17 effects the displacement of the relay contacts from the position then occupied to the other stable resting place. Armature 19 and fixed contact 20 of relay 18, in the position shown in FIGURE 1, complete the signal path for the audio channel in the television receiver associated with the remote control system.

The second output channel of balanced detector 14 is coupled over a conductor 22 to armature 23 of another set of contacts carried on relay 18. In the position shown in the drawing, movable contact or armature 23 engages a first fixed contact 24, which is connected to the input circuit of another control tube 25. The output circuit of control tube 25 is connected through operating winding 26 of a second control device or relay 27 to B+. Relay 27 is not bistable, but is constructed to restore to its normal position (as shown in FIGURE 1) after a predetermined time interval. When armature 28 of relay 27 engages contact 29, an energizing circuit is completed for the tuner drive motor (not shown) to advance the channel selector mechanism (not shown), such as a turret tuner, from a position which accepts one television channel to a position for accepting another channel in a well known manner.

When armature 23 of relay 18 connects the second output channel of detector 14 to a second fixed contact 30, the second output channel is coupled to the input circuit of a control tube 32. The output circuit of control tube 32 is coupled over winding 33 of a third control device of relay 34 to B+. Armature 35 and fixed contact 36, when closed, complete the primary circuit of the power transformer in the associated television receiver. In short, control device 18 regulates the mute function, relay 27 governs channel selection, and the last control device or relay 34 controls the on-off function of the associated receiver.

*Operation*

In considering the operation of the invention, it is assumed that the transmitter 10 includes two separate actuator buttons (not shown). Depression of the first or mute button provides a first command signal at microphone 11 integrally related to the peak response frequency of discriminator 14 which produces a command signal on conductor 15. Depression of the second or channel selector button likewise provides a second command signal integrally related to the other peak response frequency of discriminator 14, which in turn produces a command signal on conductor 22. For purposes of explanation, it is also assumed that the television receiver associated with the illustrated remote control arrangement is off, and that the remote control chassis itself has been energized by manually closing a switch (not shown) which provides the unidirectional operating potential indicated generally as B+ in FIGURE 1. Accordingly, it is first desired to energize the associated television receiver.

*Receiver On*

To turn on the receiver the viewer presses the mute button on transmitter 10, which then radiates a command signal of the proper frequency to develop a first control signal in the first output channel of detector 14. This control signal is translated over conductor 15 and amplified in control tube 16 to a level sufficient to actuate relay 18 by the current flowing through winding 17. Accordingly, contacts 19 and 20 are opened and armature 23 is displaced from contact 24 to contact 30. Thus the audio channel of the television receiver is opened; no sound can be heard until this channel is again closed. Actuation of armature 23 to engage contact 30 conditions the "on-off" channel including control tube 32 to receive a control signal.

The viewer now depresses the channel selector button, which produces another control signal in the second output channel of discriminator-detector 14. This second control signal is translated over conductor 22, armature 23, and contact 30, and is amplified in control tube 32 to cause a current flow through winding 33 sufficient to operate control device 34 and close contacts 35 and 36. Relay 34 is bistable; closure of contacts 35 and 36 completes the primary winding circuit of the power transformer in the associated television receiver, thereby turning the receiver on.

After the tubes within the television receiver warm up, a video presentation appears on the viewing screen but no sound is heard because contacts 19 and 20 of bistable relay 18 are open. Accordingly, the viewer again depresses the mute button to effect a position change of the contacts carried by relay 18. After this position change the audio channel is closed over contacts 19 and 20, and armature 23 engages contact 24, the position shown in FIGURE 1. Thus the viewer now is able to enjoy both the video and audio portions of the composite television signal received on the channel selected by the frequency-sensitive elements of the tuner.

*Channel Selection*

If the viewer wishes to change the channel and alter the program selection, the second or channel selection button is depressed. Accordingly, a control signal is translated from the lower terminal of detector 14 over conductor 22, armature 23, and contact 24 to control tube 25, the output signal of which operates relay 27 and energizes the tuner drive motor circuit to effect rotation of the channel selector mechanism within the television receiver. Control device 27 can be arranged to cooperate with the tuner elements so that those elements are driven through the same angular displacement with each energization of relay 27, or it can also be arranged to drive the tuner elements to a position which provides proper tuning for the next consecutive channel which can be received in the immediate area. With relay 18 in the position illustrated, depression of the channel selection button on transmitter 10 is effective only to select a particular channel, and has no regulation of the on-off function of the associated television receiver.

*Mute*

It is now assumed that channel selection has been effected, and the viewer wishes to mute the audio-frequency output signal of the television receiver without disturbing the channel selection or on-off functions. Accordingly, the viewer pushes the mute button on the transmitter and thus provides a control signal in the first output channel of detector 14, which signal effects the operation of control device 18 and opens contacts 19 and 20 to open the audio channel in the television receiver. Thus the sound is effectively muted; of course, armature 23 is also displaced from contact 24 to contact 30 but this does not affect the muting operation. It is evident that in the muted position of relay 18, operation of channel selection relay 27 cannot be effected; any operation of the second transmitter button while relay 18 is in the mute position is effective to turn the set off (or on, if the receiver is then off). Of course, it is a simple matter to interchange the on-off and channel selection functions so that channel selection can only be made when the television receiver is muted and the set can only be turned on or off when the normal audio output is present. Some viewers may prefer this arrangement because it also provides an audible indication of when the television receiver components are warmed up as well as minimizing the noise caused by transients when switching between channels. Such operation is easily achieved by interchanging the input leads from control tubes 25 and 32, shown connected to contacts 24 and 30, respectively.

When the viewer wishes to restore the audio output signal the first or mute button is depressed and relay 18 actuated to again close contacts 19 and 20 and provide continuity in the audio channel. Movable contact 23 is thus displaced to engage fixed contact 24 so that any operation of the second button is now effective to adjust the tuner elements.

*Receiver Off*

When it is desired to turn off the television receiver, the mute button is depressed to effect the engagement of armature 23 and contact 30, and the channel selection button is then depressed to effect the transmission of a control pulse over conductor 22 to control tube 32, so that the amplified output signal of control tube 32 effects operation of control device 34 and opens contacts 35 and 36 to turn off the associated television receiver. It is thus evident that the inventive circuit arrangement provides for a number of controlled functions, three in the illustrated embodiment, which exceeds the number of control signals of different frequency produced by transmitter 10. In the illustrated arrangement three separate controlled functions, mute, channel selection and on-off, are simply and rapidly regulated by the actuation of one or other button in transmitter 10.

The embodiment of FIGURE 2 functions in exactly the same manner as does the control system shown in FIGURE 1. The only difference is that control tube 40 replaces both control tubes 25 and 32 of the first embodiment, so that an additional economy is effected. Thus the signal channel including control tube 40 is connected to the movable contact 23, and contacts 24 and 30 are connected to relays or control devices 27 and 34, respectively.

In FIGURE 3 another embodiment of the invention is portrayed. As there shown, the output circuit of one signal channel is not switched between two separate control relays. Instead, each output channel is arranged to actuate a relay which carries two sets of contacts, with the second contact set being connected in the circuit of a third relay which itself is utilized to govern the on-off function of the associated television receiver.

Specifically, in FIGURE 3 the output circuit of control tube 16 is connected though winding 50 of bistable mute relay 51 to B+. Relay 51 includes a first contact set 52 and 53, and a second contact set 54 and 55. In the illustrated position of the contacts, the audio circuit for the television receiver is completed over armature 52 and fixed contact 53. In the other stable position of relay 51, this audio channel is open and the set is muted.

The output circuit of control tube 40 is connected through winding 56 of channel selection relay 57 to B+. Relay 57 includes a first contact pair 58 and 60, and a second contact set 61 and 62. In the illustrated position of relay 57, the energizing circuit for the tuner drive motor is open. When armature 60 engages fixed contact 58, this energizing circuit is completed and the tuner drive mechanism is rotated.

On-off relay 63 includes an operating winding 64, a first set of contacts 65 and 66, and a second contact set 67 and 68. When closed, contacts 65 and 66 complete an energizng circuit for the associated television receiver. Contacts 67 and 68, when closed, may complete a holding circuit for relay winding 64. Armature 67 is connected both to movable contact 54 and to a switch 70, which may be ganged with the power on-off switch (not shown) for the control chassis. A direct-current potential source 71 is coupled between switch 70 and one side of winding 64. This potential may be furnished by the control chassis power supply or some other means; for purposes of illustration it is represented as a battery.

The lower terminal of relay winding 64 is connected both to movable contact 61 of channel selection relay 57 and to fixed contact 55 of the mute relay. As will be made clear hereinafter, the energizing circuit for relay winding 64 can be completed over either of these contact arrangements.

In operation, when the on-off switch of the remote control chassis is closed, switch 70 is also closed. When mute relay 51 is in the sound position, as illustrated, and switch 70 is closed, an energizing circuit for relay 63 is completed over battery 71, relay winding 64, contacts 55 and 54, and switch 70. Relay 63 operates and contacts 65 and 66 are closed, thereby energizing the associated television receiver. Contacts 67 and 68 are also closed, thereby completing a holding circuit for relay winding 64 extending over switch 70, battery 71, relay winding 64, normally closed contacts 61 and 62 of channel selection relay 57, and contacts 67 and 68. Accordingly the channel selection and mute relays are now in the positions indicated in FIGURE 3, and relay 63 has been energized to close contact pair 65 and 66 and contact pair 67 and 68.

The muting of the associated television receiver is accomplished in exactly the same manner as with the embodiments of FIGURES 1 and 2. Depression of the mute button on the transmitter is effective to cause a control signal to appear in the output circuit of tube 16, which signal operates relay 51. In its operation to another stable position, contacts 52 and 53 of relay 51 are opened and the continuity of the audio channel in the associated television receiver is thereby broken. Although contacts 54 and 55 are also opened, the on-off relay 63 is not de-energized at this time because of the previously described holding circuit including contacts 67 and 68. Another actuation of the mute button returns relay 51 to the position shown, closing contacts 52 and 53 and contacts 54 and 55.

Rotation of the tuner drive mechanism is also effected in exactly the same manner, by depressing the channel selection key on the transmitter and effecting operation of relay 57. In its operation the contacts 58 and 60 are closed to complete the energizing circuit for the tuner motor. Although contacts 61 and 62 are opened to break the holding circuit for on-off relay 63, when mute relay 51 is in the sound position (as shown), an energizing circuit for relay 63 is nevertheless maintained over contacts 54 and 55 of mute relay 51. Accordingly operation of either the mute or channel selection relay individually is still effective to perform the respective control function, leaving relay 63 in the energized condition.

To turn off the associated television receiver with the embodiment shown in FIGURE 3, the mute button on the transmitter is depressed to actuate relay 51 and place this relay in the mute position, with both contact pairs opened. When contacts 54 and 55 are opened, the holding circuit for relay 63 is still maintained over contacts 61 and 62 of channel selection relay 57. After relay 51 has been placed in the mute position, the channel selection button on the transmitter is actuated to energize relay 57 and open contacts 61 and 62, thereby opening the holding circuit for relay 63. Thus relay 63 is de-energized, and contacts 65 and 66 return to the position indicated in FIGURE 3, opening the power circuit for the associated television receiver. In most respects the operation of the embodiment illustrated in FIGURE 3 is similar to that of FIGURE 2. However, it is noted that only a single signal need be sent to turn on the associated television receiver with the embodiment of FIGURE 3. Because the holding circuit for on-off relay 63 includes normally closed contacts 61 and 62 associated with the channel selection relay, a single operation of the transmitter mute button to place bistable relay 51 in the sound position is sufficient to turn on the associated television receiver. Both the mute and channel selection buttons are operated to turn off the receiver.

FIGURE 4 illustrates yet another embodiment which is similar in its essentials to that of FIGURE 3. The direct-current (D.-C.) relay 63 of FIGURE 3 has been replaced by an alternating-current (A.-C.) relay 75 in FIGURE 4. Relay 75 includes a pair of holding contacts 76 and 77, analogous to the holding contacts 67 and 68 in FIGURE 3. Relay 75 has an operating winding 78, connected to be energized from the 110 volt, 60 cycle power supply frequently found in many commercial distribution systems. This energization may be supplied over a wall plug 80 and associated line cord, when switch 70 is closed. Conductors 81 and 82 are connected in the primary power transformer circuit of the associated television receiver, and are connected in parallel with winding 78 of relay 75.

It is apparent that upon closure of switch 70, relay winding 78 is energized by the application of the full A.-C. potential translated through wall plug 80 across this winding. Accordingly the holding circuit is completed by the closure of contacts 76 and 77, and because the energizing circuit for the associated receiver including conductors 81 and 82 is connected in parallel with winding 78, the associated television receiver is also energized. The operation for turning the receiver on and off is exactly the same, for mute relay 51 and channel selection relay 57 are constructed and connected in exactly the same manner as in the embodiment of FIGURE 3. By using a heavy-duty A.-C. relay 75 instead of the D.-C. relay, one set of contacts associated with the on-off relay in FIGURE 3 is eliminated.

The increased versatility of a remote control system constructed in accordance with the inventive teaching is apparent. By utilizing the embodiment shown in FIGURE 2, it is possible to increase by 50% the control function capabilities of a two channel system with the addition of only an extra set of contacts on one control device and the provision of an extra relay for effecting the third funciton. The additional components required are inexpensive and easily adapted both to new and to existing remote control systems.

While particular embodiments of the present invention have been shown and described, it is apparent that changes and modifications may be made therein without departing from the invention in its broader aspects. The aim of the appended claims, therefore, is to cover all such changes and modifications as fall within the true spirit and scope of the invention.

I claim:

1. A television receiver remote control system for selectively accomplishing a number of receiver control functions in response to the receipt of a lesser number of remotely transmitted time-spaced control signals, comprising:

a control-signal receiver for said control signals, having a pair of output channels;

a first control device coupled to one of said output channels and operating in response to receipt of a control signal, said device including a control means and first and second switch means concurrently operated by said control means, said first switch means effecting a first control function;

second and third control devices for effecting second and third control functions, respectively, in response to receipt of a second control signal;

said second switch means being bistable and switching the other of said output channels alternately into and out of coupling with the respective second and third control devices to condition one of said second and third control devices to respond to said second control signal upon every second occurrence of said first control signal.

2. A television receiver remote control system for selectively accomplishing a number of receiver control functions in response to the receipt of a lesser number of remotely transmitted time-spaced control signals, comprising:

a control-signal receiver for said control signals, having a pair of output channels;

a first control device coupled to one of said output channels and operating in response to receipt of a first control signal, said device including a control means and first and second bistable switch means concurrently operated by said control means, said first bistable switch means effecting a first control function;

second and third control devices for effecting second and third control functions, respectively, in response to receipt of a second control signal;

said second bistable switch means switching the other of said output channels alternately into and out of coupling with the respective second and third control devices to condition one of said second and third control devices to respond to said second control signal upon every second occurrence of said first control signal.

3. A television receiver remote control system for selectively accomplishing a number of receiver control functions in response to the receipt of a lesser number of remotely transmitted time-spaced control signals, comprising:

a control-signal receiver for said control signals, having a pair of output channels;

a first control device coupled to one of said output channels and operating in response to the receipt of a first control signal, said device including a control means and first and second switch means concurrently operated by said control means, said first switch means effecting a first control function;

additional control devices for effecting additional control functions, respectively, in response to receipt of at least one additional control signal;

said second switch means being multi-stable and switching the other of said output channels sequentially from coupling with one to coupling with another of said additional control devices to condition successively different ones of said additional control devices to respond to an additional control signal upon repeated occurrences of said first control signal.

4. A television receiver remote control system for selectively accomplishing a number of receiver control functions in response to the receipt of a lesser number of remotely transmitted time-spaced control signals, comprising:

a control-signal receiver for said control signals, having a pair of output channels;

a first control device coupled to one of said output channels and operating in response to the receipt of a first control signal, said device including a first control means and first and second switch means concurrently operated by said first control means, said first switch means effecting a first control function;

a second control device operating in response to the receipt of a second control signal, said device including a second control means and third and fourth switch means concurrently operated by said second control means, said third switch means effecting a second control function;

a third control device including fifth switch means for effecting a third control function;

said second switch means enabling energization of said third control device in response to said first control signal;

and said fourth switch means maintaining energization of said third control device only in the absence of said second control signal and subsequent to the actuation of said second switch means.

References Cited in the file of this patent

UNITED STATES PATENTS

| | | |
|---|---|---|
| 2,490,768 | Althouse et al. | Dec. 13, 1949 |
| 2,817,025 | Adler | Dec. 17, 1957 |
| 2,954,545 | Drake | Sept. 27, 1960 |

OTHER REFERENCES

Electronics, April 1954, pp. 172–176 (Schultheis). (Copy in Scientific Library.)